Oct. 15, 1940.    W. RUNGE ET AL    2,218,361
DIRECTION FINDER
Filed April 14, 1938    2 Sheets-Sheet 1
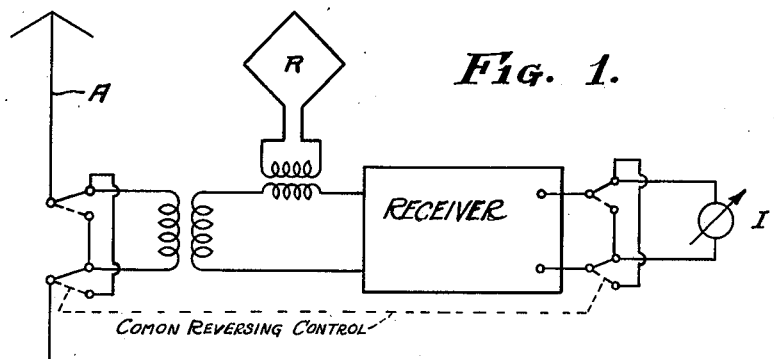
Fig. 1.
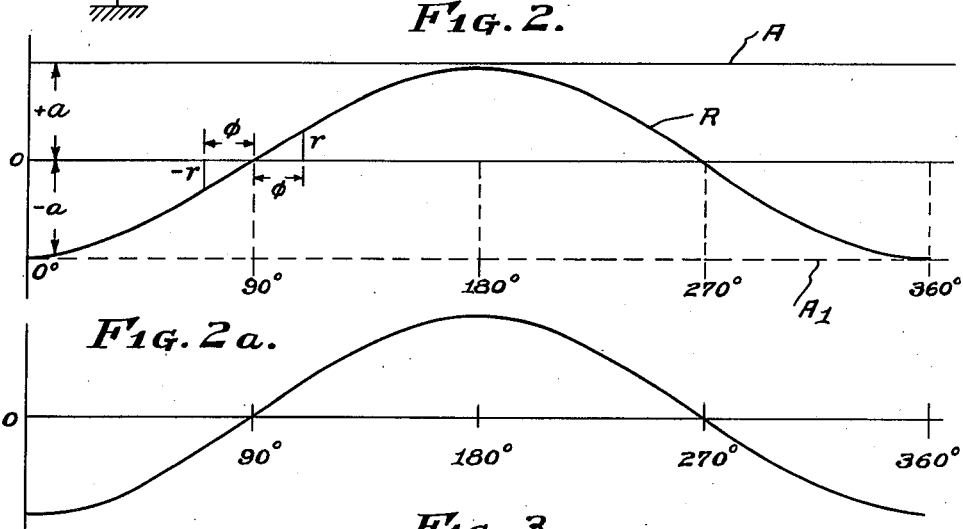
Fig. 2.
Fig. 2a.
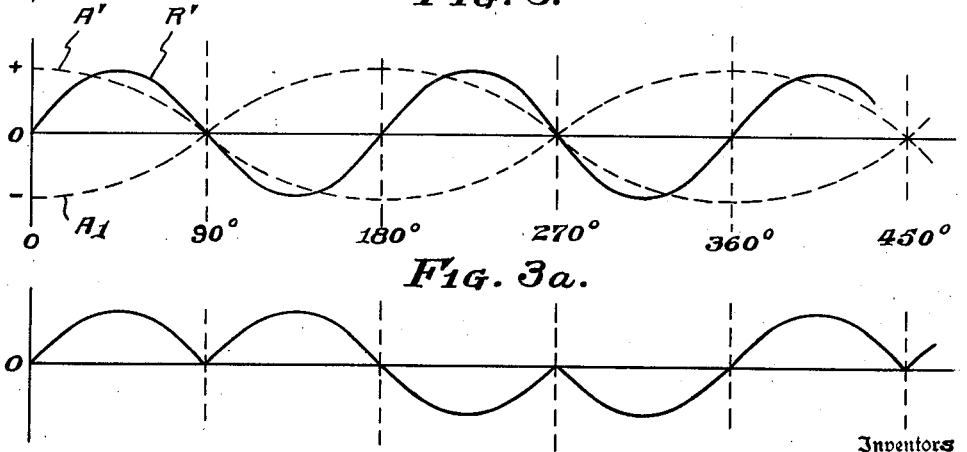
Fig. 3.
Fig. 3a.
Inventors
Wilhelm Runge
Albrecht Gothe
By 
Attorney

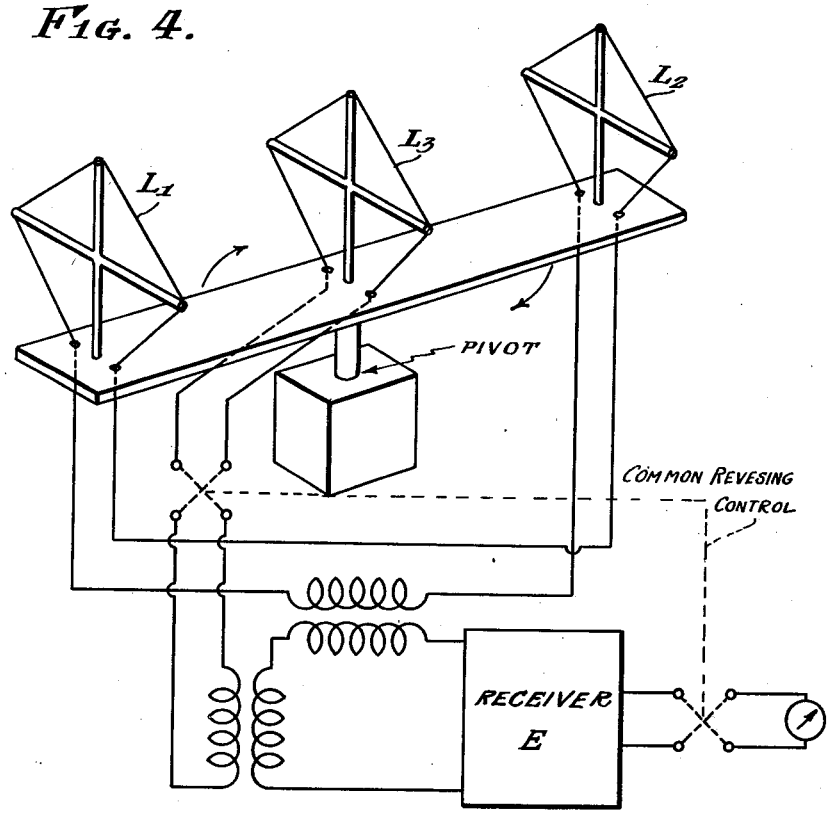

Patented Oct. 15, 1940

2,218,361

UNITED STATES PATENT OFFICE 2,218,361

DIRECTION FINDER

Wilhelm Runge and Albrecht Gothe, Berlin, Germany, assignors to Telefunken Gesellschaft für Drahtlose Telegraphie m. b. H., Berlin, Germany, a corporation of Germany Application April 14, 1938, Serial No. 202,036
In Germany April 7, 1937

5 Claims. (Cl. 250—11)

The usual mode of direction-finding is predicated upon the use of a rotating loop which, however, because there are two minima, fails to furnish unequivocal evidence regarding the direction or true bearing. In fact, it is only by the addition of a non-directional auxiliary antenna whose current is roughly in phase with the frame or loop current that the bearing can be made true or that the sense can be determined.

Other methods also are known in the earlier art which are based for their operation upon a directional and a non-directional aerial; for instance, a bidirectional frame or loop R and a straight aerial A, both of which are in simultaneous coupling relation with the receiver E. In the output circuit of the receiver E is included an indicator or reading instrument I whose polarity is reversed in synchronism with the reversal of the connections of the aerial A (see Fig. 2). Arrangements of this nature have been known in the art for some time as target-bearing sense-finding (or unidirectional direction finders) receivers. Also in the practical use of receivers of the said sort it has heretofore been necessary, with a view to ascertaining the sense, to either employ another loop serial turned an angle of 90 degrees in reference to the first loop or else to resort to a different sense-finding method. It is known from practice that this means an extra outlay both as regards the receiving arrangement as well as the time required for observing bearings.

The method of this invention, which comprises the use of a direction-finder scheme consisting of a directional aerial and an auxiliary aerial, with one of these antennae being changed in polarity in synchronism with an indicator instrument included in the output circuit of the receiver, has this outstanding feature that the combination of directional antenna and auxiliary antenna is effected in such a way that the correct bearing lies in the minimum in which the needle of the instrument moves in the same sense in which the directional antenna is turned. In this manner unequivocal direction-finding with sense indication is immediately obtained.

This invention will be better understood from the following description when considered in connection with the accompanying drawings, in which Figure 1 is a directional system as known in the prior art; Figures 2 and 3 are curves illustrating this invention; and Figure 4 is a schematic representation of an embodiment of this invention.

The process with the aim of sense finding based upon the method of this invention shall be explained in more detail by reference to Figs. 1 and 2a: As a frame or loop antenna is rotated, there results an amplitude characteristic as shown in graph R, and it will be seen that the amplitude is of zero value in two directions shifted an angle of 180 degrees. In the graph, these minimum or zero signal strength points are located at 90 and at 270 degrees. The amplitude of a vertical auxiliary antenna for all directions is of like size and value; in fact, it is roughly equal to the maximum or crest amplitude of the frame or loop. According to the polarity of the auxiliary antenna there results characteristic A or $A_1$.

If the loop be displaced by an angle of $90°-\phi$ then, by reference to Fig. 2 there results a frame amplitude of $-r$. The amplitude of the auxiliary antenna in all cases is either equal to $a$ or to $-a$, the sign to indicate, as the case may be, the same or the opposite phase of the antenna current in reference to the loop current. Upon reversing the polarity of the auxiliary antenna in frame position $90°-\phi$, the receiver potential fluctuates between $a-r$ and $-a-r$. For a frame position $90°+\phi$, on the contrary, it oscillates between $a+r$ and $-a+r$. If the indicator or reading instrument in the output circuit of the receiver is reversed in polarity at the same time as the auxiliary antenna, then the mean oscillation, for frame position 90 degrees, lies in the zero of the instrument. If the loop is at $90°-\phi$, then the deflection of the instrument is proportional to the mean between $a-r$ and $-a-r$, in other words, $-r$ and in the loop position $90°+\phi$ proportional to the voltage $+r$. The deflection of the instrument, upon revolving the loop, therefore has a shape as the amplitude characteristic of the loop (Fig. 2a). Turning the loop in clockwise direction beyond direction 90 degrees, then also the needle of the instrument included in the receiver output circuit will turn from left to right. Turning the frame in clockwise direction beyond the second minimum point, at 270 degrees, then the needle of the instrument will move from right to left. Hence, the combination of loop and auxiliary antenna may be effected in such a way that the correct bearing or the sense lies in the minimum for which the needle of the instrument turns from left to right, if the loop is likewise turned in clockwise direction.

In a similar manner unequivocal direction-finding (sense-finding) is also possible with the use of two parallel loops or frames $L_1$ and $L_2$ connected in opposition or differentially. This scheme, as well known from practice, eliminates night effects to a large extent. But in accordance with this invention, an auxiliary loop L₃ is required instead of an auxiliary antenna which is connected in parallel relationship to the two direction-finding loops, as shown in Fig. 4.

In Fig. 3 is shown again the characteristic of the double-loop direction-finder and it is there designated by R'. The curves A' and A' correspond to the characteristics of the auxiliary loop L₃ for its two polarities. A twin-loop direction-finder apparatus, as well known in the art, has four minimum points. Two of these coincide with the minima of the auxiliary loop, while the other two minima are shifted an angle of 90 degrees in reference thereto. Revolving the twin-loop direction-finder and with steady simultaneous reversal of polarity of the auxiliary loop and the indicator or reading instrument operating in series, a needle deflection will be noted in the output instrument of the receiver as shown in Fig. 3a. Turning the loop beyond the 90-degree and the 270-degree positions, also the instrument deflection will show a minimum, though the deflection will not shift to the opposite side of zero. This happens only in the presence of the minima at 180 and 360 degrees. However, as in the above instance, these two distinguish themselves again in that the needle shift in one case is equi-directional with the loop motion, and in the other case it is opposite in direction. Hence, the circuit organization may again be so chosen that upon passage through the correct minimum loop rotation and needle movement are in identical senses.

The indicator or visual reading instrument in the output circuit of the receiver could also be employed to drive means for automatic adjustment of the direction-finder in such a way that the direction-finding organization adjusts itself always to the correct minimum point. It will be evident that the present invention and its practical utility are not restricted by any means to direction-finding systems which are predicated for their operation upon direction-finder loops; indeed, it is generally applicable to direction-finding systems in which equivocal minimum positions are obtained, such as the Adcock direction-finding system.

We claim as our invention:

1. A direction finder including, in combination, a pair of loop antennas connected in phase opposition, an auxiliary loop antenna, means for combining currents derived from said antennas to produce a resultant current, means for indicating said resultant current, and means for simultaneously reversing the relative phase of currents derived from said auxiliary loop antenna with respect to currents derived from said pair of loop antennas and the phase of said resultant current.

2. A direction finder including, in combination, a pair of parallel loop antennas differentially connected, an auxiliary loop antenna, means for combining currents derived from said auxiliary loop antenna with currents derived from said parallel loop antennas, an indicator connected to said combining means and responsive to the resultant amplitude of said combined currents, and means for synchronously reversing the connections to said indicator and the relative phase of said combined currents.

3. A direction finder including a pair of rotatable parallel loop antennas connected in opposition, an auxiliary loop antenna rotatable with said parallel loop antennas, means including a reversing switch for combining currents derived from said parallel loop antennas with currents derived from said auxiliary loop antenna, a receiver having input and output circuits, means for applying said combined currents to said input circuit, an indicator, means including a second reversing switch for connecting said indicator to said output circuit, and means for synchronously operating said reversing switches.

4. A device of the character described in claim 3 in which said auxiliary loop antenna is parallel to said pair of loop antennas.

5. A direction finder including, in combination, a pair of rotatable bidirectional antennas connected in opposition, an auxiliary bidirectional antenna rotatable with said pair of antennas, means including a reversing switch for combining currents derived from said pair of antennas with currents derived from said auxiliary antenna, a receiver having input and output circuits, means for applying said combined currents to said input circuit, an indicator, means including a second reversing switch for connecting said indicator to said output circuit, and means for synchronously operating said reversing switches.

WILHELM RUNGE.
ALBRECHT GOTHE.